(12) United States Patent
Diorio (10) Patent No.: US 7,339,462 B1
(45) Date of Patent: Mar. 4, 2008

(54) REVERSE GEAR VOLUME REDUCER

(76) Inventor: Chris Diorio, 104 Prospect Ct., Bellmore, NY (US) 11710

( * ) Notice: Subject to any disclaimer, the term of this patent is extended or adjusted under 35 U.S.C. 154(b) by 233 days.

(21) Appl. No.: 11/220,316

(22) Filed: Sep. 6, 2005

(51) Int. Cl.
*B60Q 1/00* (2006.01)

(52) U.S. Cl. .......................................... 340/456; 701/36

(58) Field of Classification Search ............... 381/71.4; 701/36, 64; 340/456, 438, 902, 932.2; 358/10
See application file for complete search history.

(56) References Cited

U.S. PATENT DOCUMENTS

| | | | |
|---|---|---|---|
| 3,898,652 A | 8/1975 | Rashid | |
| 3,943,507 A | 3/1976 | Neal et al. | |
| 4,603,317 A | 7/1986 | Gailbreath et al. | |
| 4,851,813 A | 7/1989 | Gottlieb | |
| 4,885,567 A | 12/1989 | Katz | |
| 4,903,007 A | 2/1990 | Gottlieb | |
| 5,132,665 A | 7/1992 | Hutchisson et al. | |
| 5,574,426 A | 11/1996 | Shisgal et al. | |
| 6,064,302 A | 5/2000 | Peterson et al. | |
| 6,433,680 B1 | 8/2002 | Ho | |
| 6,604,592 B2 | 8/2003 | Pietsch et al. | |
| 6,885,295 B2 | 4/2005 | Hanson-Abbott et al. | |
| 7,158,015 B2 * | 1/2007 | Rao et al. ................... | 340/436 |
| 2006/0244313 A1 * | 11/2006 | Sullivan ..................... | 307/9.1 |

* cited by examiner

*Primary Examiner*—Jeffery Hofsass
*Assistant Examiner*—Sigmund Tang
(74) *Attorney, Agent, or Firm*—Michael I Kroll (57) ABSTRACT

An apparatus for modifying sound audibilized from an audio component in a vehicle comprising a processor connected to the audio component and for controlling the operation thereof. A sensor is connected to a gear box of the vehicle for sensing a position of a gear in the vehicle and further connected to the processor. The sensor senses the position of the gear and determines if the gear is in one of a first position or a second position and causes the processor to modify the audibilized sound based on the determination from a first sound level to a second sound level.

16 Claims, 9 Drawing Sheets

INVENTION ENGAGED (SILENCE)

FIG. 7
INVENTION DISENGAGED
(PRIOR ART)

FIG. 8

INVENTION DISENGAGED
(PRIOR ART)

FIG. 9

REVERSE GEAR VOLUME REDUCER

BACKGROUND OF THE INVENTION

1. Field of the Invention

The present invention relates to a vehicular safety device, and more specifically, to a reverse gear volume reducer. A sensor is connected to the gearshift of the vehicle for sensing the position of the gearshift. A cutoff switch is automatically actuated when the sensor senses the gearshift of a vehicle is in the reverse position. Actuation of the cutoff switch results in the volume of the vehicular audio components being at least one of decreased to a predetermined level and cutoff. The decrease or cessation in audio component volume can prevent accidents by reducing the distractions to the driver when reversing and increasing the driver's ability to hear outside sounds.

2. Description of the Prior Art

Numerous other reverse gear volume reducer systems exist in the prior art. Typical of these are U.S. Pat. Nos. 3,898,652; 3,943,507; 4,603,317; 4,851,813; 4,885,567; 4,903,007; 5,132,665; 5,574,426; 6,064,302; 6,433,680; 6,604,592; and 6,885,295. While these reverse gear volume reducer systems may be suitable for the purposes for which they were designed, they would not be as suitable for the purposes of the present invention, as hereinafter described.

U.S. Pat. No. 3,898,652

Inventor: Mary D. Rashid

Issued: Aug. 5, 1975

A vehicle safety system for detecting the presence of objects in the vicinity of the vehicle and for producing an indication upon the detection of the objects. The system comprises a front sensor and rear sensor each of which includes a Doppler radar and side sensors which include proximity radars. The system also includes a vehicle velocity sensor which senses the velocity of the vehicle and produces an output indicative thereof. A signal processing unit receives the outputs of the front and rear sensors and the vehicle velocity sensor and produces an output which is indicative of the vehicle's capability of stopping prior to colliding with an object detected in front of the vehicle, and also produces an output indicative of the range and closing speed of an object detected to the rear of the vehicle. An indicator is coupled to the signal processing unit and produces a signal indicative of the signal processor output, and signals indicative of the location of an object alongside the vehicle. The output of the processing unit may also be applied to the vehicle brake and accelerator controls for slowing down the vehicle if the operator does not respond properly to a warning signal generated by the indicator.

U.S. Pat. No. 4,885,567

Inventor: Danny Katz

Issued: Dec. 5, 1989

A vehicular back-up lamp alarm device, comprising a sonic element, such as a buzzer, which is an integral part of the lamp base or of socket for receiving it. The sonic element is connected so it will be in parallel with the back-up lamp. Alternatively, the sonic element may be an integral part of a socket converter having a conventional lamp base and socket, and connected in parallel with the electrical connections between such base and socket. As a result, the operating voltage which is applied to the back-up lamp when the vehicle is put into reverse gear will also cause the sonic element to emit an audible alarm.

U.S. Pat. No. 6,064,302

Inventor: Edwin R. Peterson et al.

Issued: May 16, 2000

A light activated back-up alarm is provided for use with a vehicle having at least one white back-up light. It includes an optical sensor for attachment to the outside lens of the vehicle back-up light and an alarm circuit and battery encased within an alarm housing. The optical sensor is adhesively attached to the light and the alarm housing adhesively attached to some other portion of the vehicle.

U.S. Pat. No. 3,943,507

Inventor: Franklin D. Neal et al.

Issued: Mar. 9, 1976

A solid state alarm circuit for producing intermittent alarm signals when a vehicle is operated in reverse. The circuit includes a sound generator modulated by a pulse generator to produce bursts of oscillations which drive sound producing loudspeakers.

U.S. Pat. No. 4,903,007

Inventor: Mark Gottlieb

Issued: Feb. 20, 1990

A combination back-up light and sound emitting device for use with an automobile includes a housing having a base at one end and a socket at the other end. A light bulb is mounted in the socket of the housing and a sound emitting device is also mounted in the housing. Bayonet type connectors are formed on the base of the housing and are electrically connected to the light bulb and sound emitting device. The bayonet type connectors are used for mechanically connecting the housing to the back-up light socket of a vehicle tail light assembly, so that installation of the combination back-up light and sound emitting device can be accomplished simply by inserting the base into the back-up light socket and turning so as to secure the bayonet type connection.

U.S. Pat. No. 6,433,680

Inventor: Chao-Ting Ho

Issued: Aug. 13, 2002

The present invention relates to a license plate having reverse alarm device, more particularly to a license plate frame comprising a reverse alarm device with reverse alarm radar and a vehicle reverse monitoring camera mechanism to improve the safety when the user reverses a motor vehicle.

U.S. Pat. No. 4,603,317

Inventor: Samuel H. Gailbreath et al.

Issued: Jul. 29, 1986

An improved electrically-operated backup alarm for use on mobile construction and industrial machinery, including selectable lower and higher loudness levels, automatically adjustable loudness level with respect to varying ambient noise level in which the alarm is operating, high and low frequency compensation to substantially eliminate high and low frequency signal components of the sensed ambient noise, and compensation for responding to transient signal components of the sensed ambient noise.

U.S. Pat. No. 5,132,665

Inventor: James Hutchisson et al.

Issued: Jul. 21, 1992

A self-powered back-up alarm for mounting to the wheel hub of a heavy truck or like vehicle. The alarm includes a housing adapted to be mounted to a vehicle wheel hub. Inside the housing is a magnetized stator that is held stable by a counterweight mounted for free rotation to a spindle in the housing. Also mounted in the housing is a power supply including a coil positioned adjacent the stator in the housing and attached thereto so that it rotates about the stator when the wheel hub turns. A battery stores the energy developed across the coil when the wheel hub rotates. Also mounted inside the housing are sensors located adjacent the stator that similarly rotate with the wheel hub. The sensors, in combination with an associated detect circuit, produce a reverse motion signal whenever the vehicle backs up. An audio alarm, located in the housing, is actuated by the reverse motion signal and emits an audible warning whenever the vehicle backs up.

U.S. Pat. No. 6,604,592

Inventor: Frank Pietsch et al.

Issued: Aug. 12, 2003

A method and device prevents damage to a vehicle approaching an obstacle, such as, for example, a loading ramp, while traveling in reverse. When a vehicle, particularly a vehicle train consisting of a towing vehicle and a trailer or semi-trailer, approaches an obstacle in reverse travel, there exists the possibility that the vehicle may impact the obstacle as a result of an erroneous estimation or inappropriate driving maneuver, potentially resulting in damage to the vehicle and/or to the obstacle. This problem occurs with relative frequency, particularly when approaching a loading ramp. In accordance with the invention, the driver of the vehicle is assisted during reverse travel such that damage due to excessive impact is automatically avoided, independently of the driver's actions. A distance sensor is installed on the vehicle, near the tail, which transmits a signal representative of the distance from an obstacle to an electronic control device. The electronic control device evaluates the distance value measured by the distance sensor and adapts the speed of the vehicle during reverse travel in accordance with a predetermined algorithm in such manner that the approach to the obstacle takes place without damage to the vehicle and/or the obstacle. The control device advantageously influences the braking system of the vehicle and, if necessary, the drive engine, in a suitable manner.

U.S. Pat. No. 4,851,813

Inventor: Mark Gottlieb

Issued: Jul. 25, 1989

A combination back-up light and sound emitting device for use with an automobile includes a housing having a base at one end and a socket at the other end. A light bulb is mounted in the socket of the housing and a sound emitting device is also mounted in the housing. Bayonet type connectors are formed on the base of the housing and are electrically connected to the light bulb and sound emitting device. The bayonet type connectors are used for mechanically connecting the housing to the back-up light socket of a vehicle tail light assembly, so that installation of the combination back-up light and sound emitting device can be accomplished simply by inserting the base into the back-up light socket and turning so as to secure the bayonet type connection.

U.S. Pat. No. 5,574,426

Inventor: Ben Z. Shisgal et al.

Issued: Nov. 12, 1996

An electronic obstacle detection system for guiding and warning a motorist of obstacles in the detection area while backing-up. The main components of the system include a pair of sensor clusters to be affixed to the rear of the vehicle, a pair of exterior visual indicators, and an audio-visual indicator located in the vehicle. Each of the sensor clusters are encased in a housing having angled, stepped portions configured to provide complete area coverage of transmitted and received signals.

U.S. Pat. No. 6,885,295

Inventor: Christopher Hanson-Abbott et al.

Issued: Apr. 26, 2005

A reversing alarm for a vehicle emits an audible signal in the form of pulses of broad band sound when the vehicle is put into reverse gear. The broad band sound allows persons in the vicinity to locate the vehicle, as the human brain is able to process broad band sound to pinpoint the location of the sound source in a way which is not possible with single tone sounds. The alarm is implemented via a simple electronic circuit which uses a zener diode as a signal generator 20 to generate the broad band sound.

SUMMARY OF THE PRESENT INVENTION

The present invention relates to a vehicular safety device, and more specifically, to a reverse gear volume reducer. A sensor is connected to the gearshift of the vehicle for sensing the position of the gearshift. A cutoff switch is automatically actuated when the sensor senses the gearshift of a vehicle is in the reverse position. Actuation of the cutoff switch results in the volume of the vehicular audio components being at least one of decreased to predetermined level and cutoff. The decrease or cessation in audio component volume can prevent accidents by reducing the distractions to the driver when reversing and increasing the driver's ability to hear outside sounds.

A primary object of the present invention is to provide a volume reducing mechanism that overcomes the shortcomings of the prior art.

Another, secondary object of the present invention is to provide a volume reducing mechanism for use in a vehicle.

Another object of the present invention is to provide a volume reducing mechanism that is connected to and controlled by a gearshift sensor.

Yet another object of the present invention is to provide a volume reducing mechanism whereby the gearshift sensor senses the position of the gearshift.

Still another object of the present invention is to provide a volume reducing mechanism wherein the position of the gearshift in the gear box controls volume operation.

An additional object of the present invention is to provide a volume reducing mechanism that reduces the volume of an audio component in a vehicle when the gearshift of the vehicle is determined to be in the reverse position.

A further object of the present invention is to provide a volume reducing mechanism wherein the volume is reduced to a preset lowered level.

Still yet another object of the present invention is to provide a volume reducing mechanism wherein the operation of the audio component is halted resulting in no audible sound.

Yet another object of the present invention is to provide a volume reducing mechanism whereby there is a gradual increase in volume when the gearshift moves to the drive position over a 5-second period.

Another object of the present invention is to provide a volume reducing mechanism whereby the volume of the audio component is restored to pre-reduction volume level when the vehicular gearshift is determined to be in a drive position.

Further still, an object of the present invention is to provide a volume reducing mechanism which can be applied to any type of vehicle.

Still another object of the present invention is to provide a volume reducing mechanism wherein the types of vehicles include but are not limited to automobiles, trucks, SUVs, tractors, boats and motor homes.

Another object of the present invention is to provide a volume reducing mechanism wherein the audio component includes but is not limited to the radio, a CD player, a tape deck, an MP3 player, a television, a DVD player, a VCR and gaming equipment.

Further still, an object of the present invention is to provide a volume reducing mechanism wherein the audio component can also include an external device connected through an input.

Yet another object of the present invention is to provide a volume reducing mechanism that is simple and easy to use.

Still yet another object of the present invention is to provide a volume reducing mechanism that is inexpensive to manufacture and operate.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Turning now descriptively to the drawings, in which similar reference characters denote similar elements throughout the several views, the Figures illustrate the reverse gear volume reducer of the present invention. With regard to the reference numerals used, the following numbering is used throughout the various drawing Figures.

10 Reverse gear volume reducer of the present invention
12 gear shift
14 user
16 audio component
18 vehicle
20 music
22 processor
24 child
26 cell phone
28 handle
30 gear indicator panel
32 markings
34 gear shift sensor
36 indicator arrow
38 switch

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 9 illustrate a volume reducing mechanism of the present invention which is indicated generally by the reference numeral 10.

Figure 1:
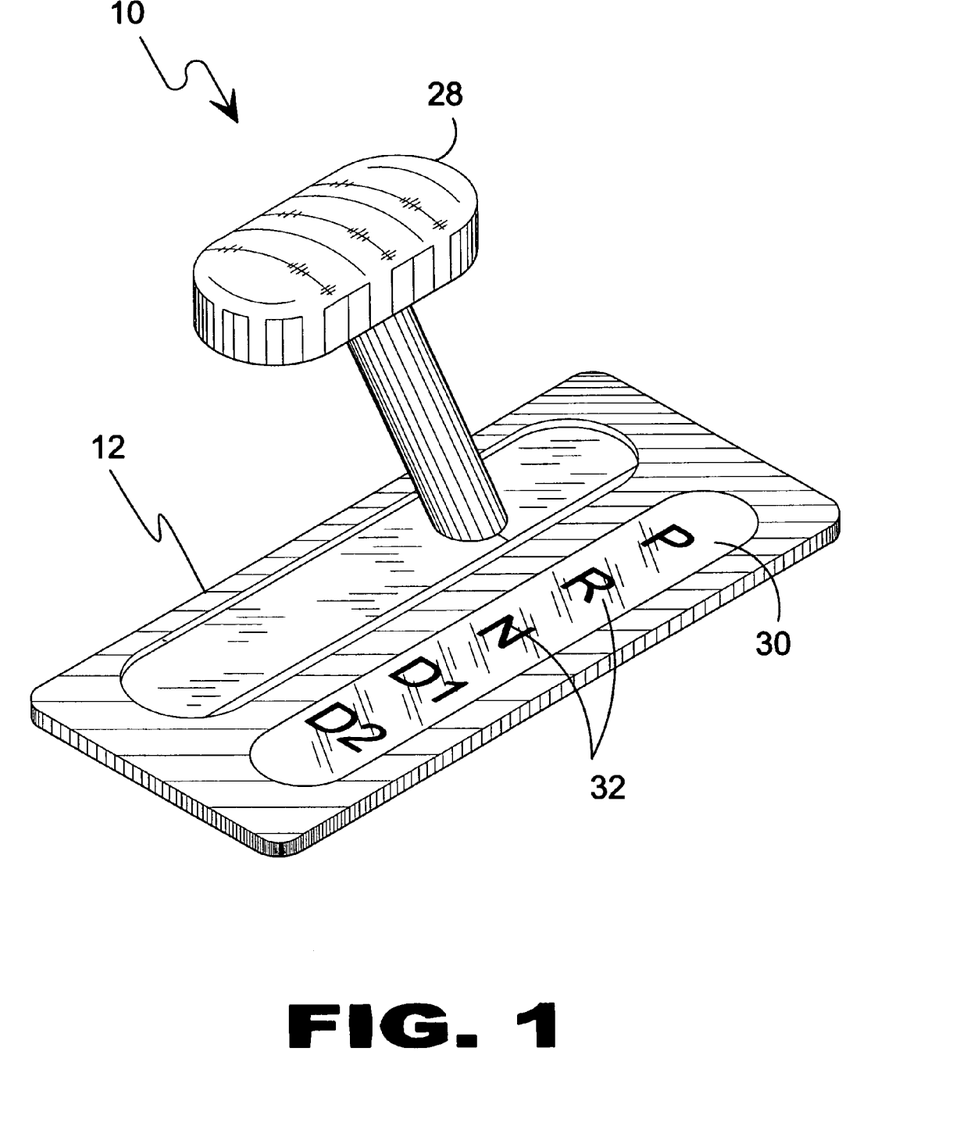
FIG. 1 is a perspective view of a gear shift of the volume reducing mechanism of the present invention.

FIG. 1 is a perspective view of the volume reducing mechanism 10 of the present invention. The volume reducing mechanism 10 includes a gear shift sensor 34, not shown, to determine the current status of the gearshift of a vehicle 18, shown in FIG. 2. The volume reducing mechanism 10 further includes a gearshift 12 for selecting the gear in which the car is operating. The gearshift 12 includes a handle 28 and a gear indicator panel 30. The gear indicator panel 30 includes a plurality of markings 32 typically found thereon for indicating the gear status of the vehicle 18. The markings 32 include a "P" corresponding to "park," an "R" corresponding to "reverse," an "N" corresponding to "neutral," and at least one marking to indicate "drive," shown herein by a "D." The handle 28, as is typical of gearshift handles 28, shifts between the gears of the vehicle 18. As shown herein, the handle 28 is displaced adjacent to the "R" indicating the vehicle 18 is in the "reverse" gear.

Figure 4:
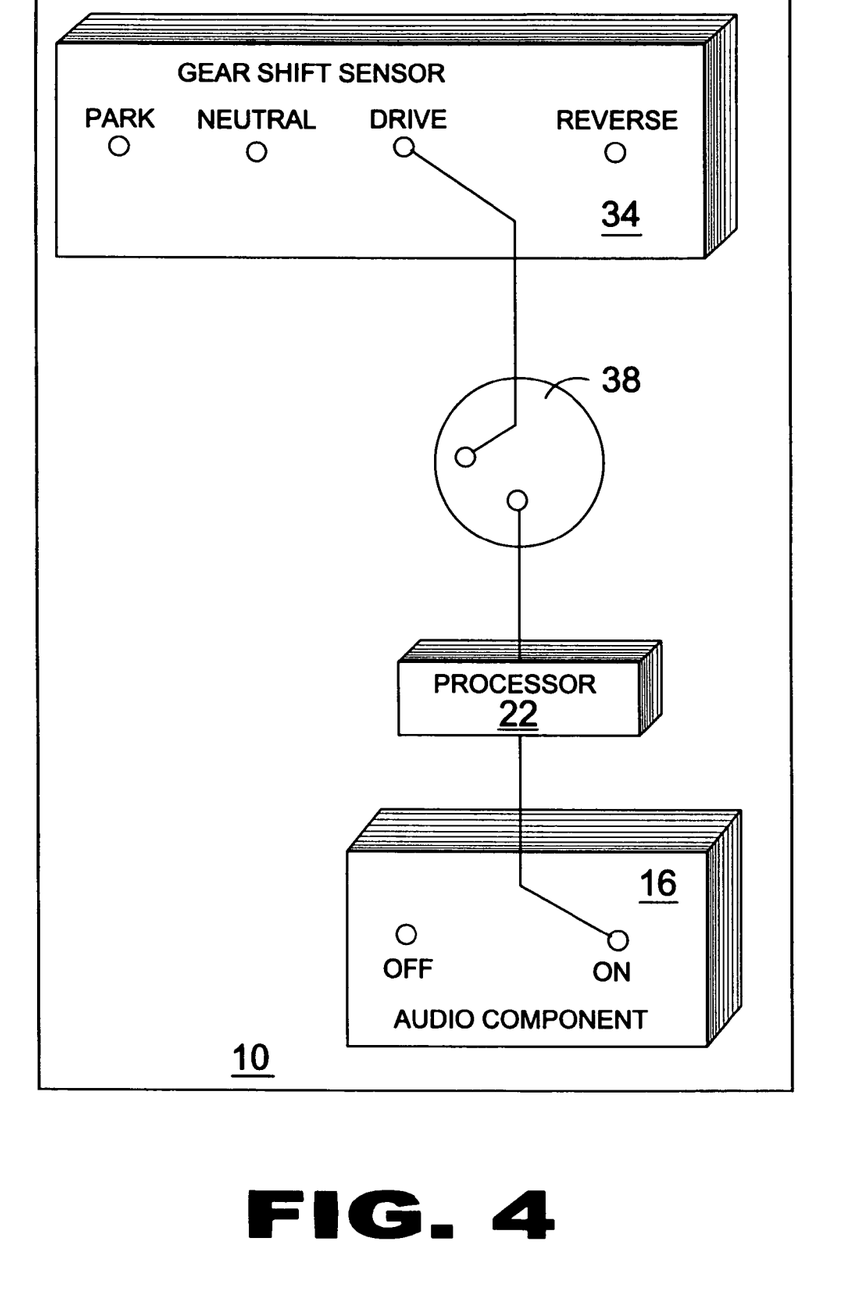
FIG. 4 is a block diagram of the gear shift of the volume reducing mechanism of the present invention.

The volume reducing mechanism 10 of the present invention is advantageous in that makes vehicular 18 operation safer. The gearshift sensor 34, as shown in FIG. 4, senses the current position of the gear of the vehicle. When the gearshift 12 is in the R position as shown herein, if an audio component 16 is audibilizing content, the volume of the audio component 16 is reduced to a specified level. Reducing the volume of the audio component 16 when the vehicle 18 is sensed to be in "reverse" allows a user 14 to focus on driving the car in reverse. Increasing the user's 14 focus on driving in reverse increases the likelihood that it will be done safely by improving the driver's attention to details in the surrounding area. The present invention 10 allows for the volume of the audio component to be selectively increased when the gear of the vehicle 18 is sensed to be in at least one of "park", "drive" and "neutral".

Figure 2:
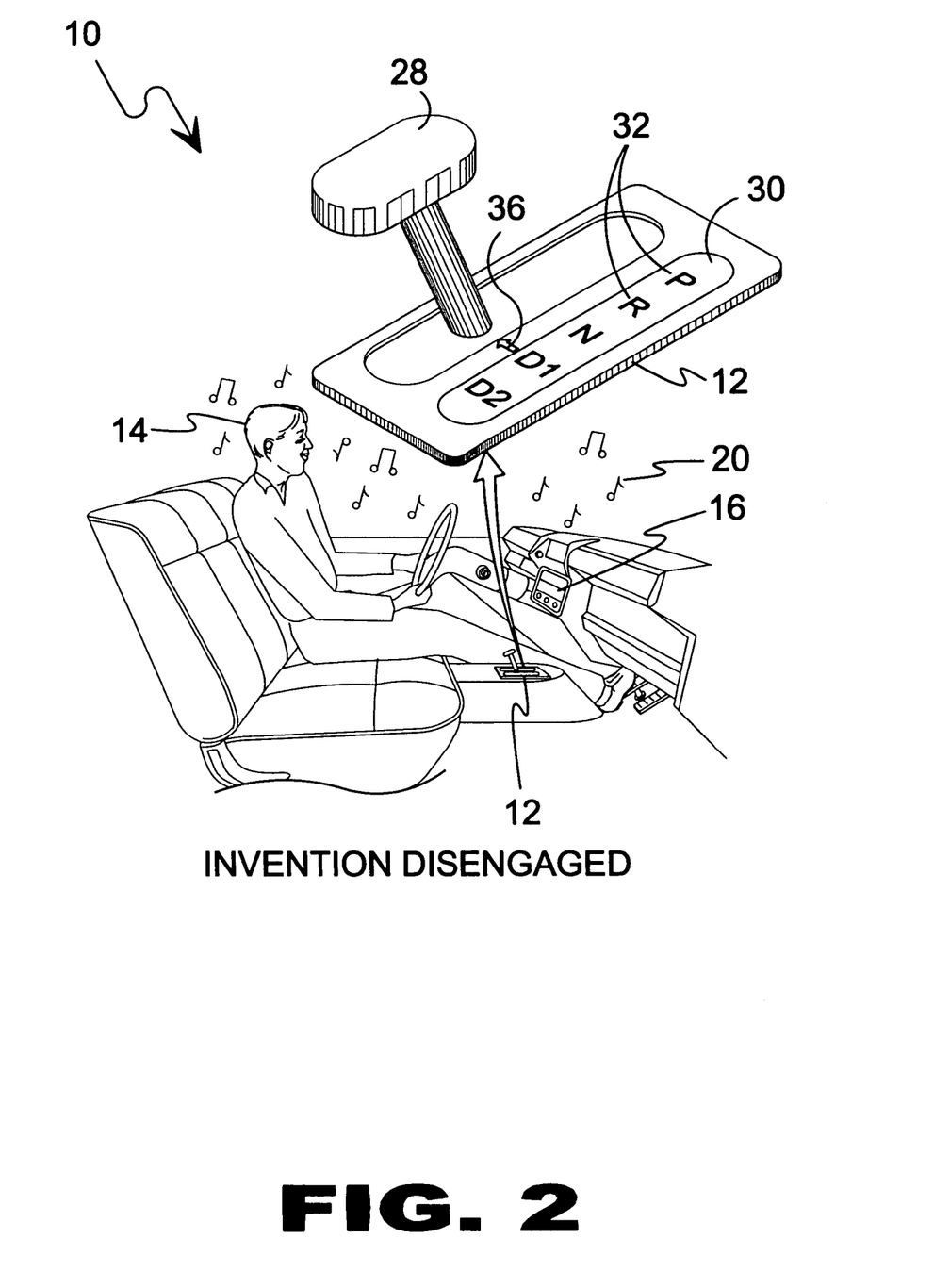
FIG. 2 is an illustrative view of the different positions of the gear shift of the volume reducing mechanism of the present invention.

FIG. 2 is an illustrative view of the volume reducing mechanism 10 of the present invention. The volume reducing mechanism 10 includes the gear shift sensor 34, not shown, to determine the current gear status of the vehicle 18. The volume reducing mechanism 10 further includes the gearshift 12. The gearshift 12 includes the handle 28 and the gear indicator panel 30. The plurality of markings 32 typically found on the gear indicator panel 30 are located thereon for indicating the gear status of the vehicle 18. The markings 32 include the "P" corresponding to "park," the "R" corresponding to "reverse," the "N" corresponding to "neutral," and at least one marking to indicate "drive," shown herein by a "D." The handle 28, as is typical of gearshift handles 28, shifts between the gears of the vehicle 18.

The user 14 is in the vehicle 18. As shown herein, an indicator arrow 36 shows that the handle 28 of the gearshift 12 is adjacent to D1 on the gear indicator panel 30 and thus the vehicle 18 is in drive. When the sensor 34 senses that the gear of the vehicle 18 is one of P, N, or D, the audio component 16 is permitted to audibilize a sound 20 from at least one output device such as speakers, described herein as music, at a level selected by the user 14. This music 20 is shown as plurality of musical notes and is shown for purposes of example only, and any number of sounds may be broadcast from the audio component 16.

Figure 3:
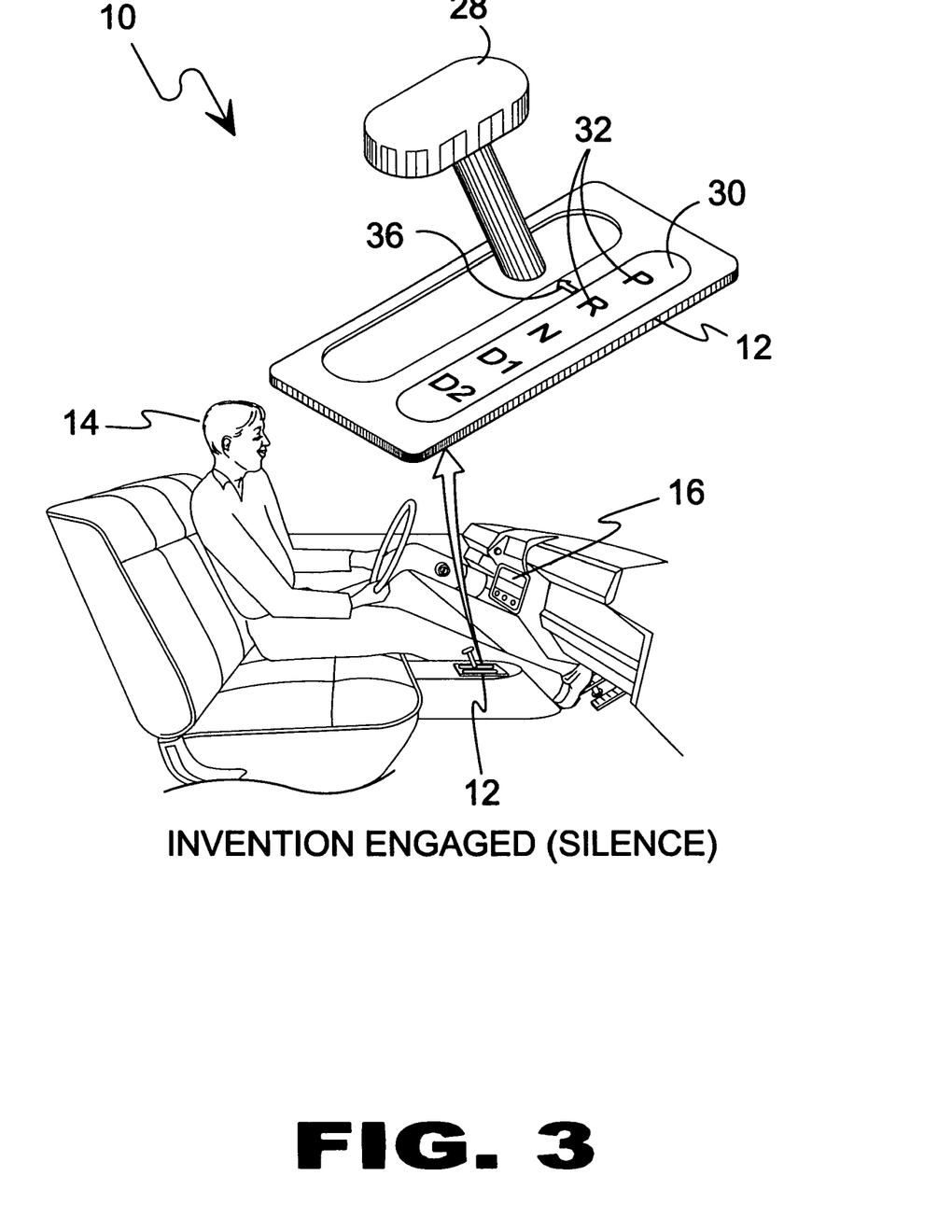
FIG. 3 is an illustrative view of the different positions of the gear shift of the volume reducing mechanism of the present invention.

FIG. 3 is an illustrative view of the volume reducing mechanism 10 of the present invention. The volume reducing mechanism 10 includes the gear shift sensor 34, not shown, to determine the current gear status of the vehicle 18. The volume reducing mechanism 10 further includes the gearshift 12. The gearshift 12 includes the handle 28 and the gear indicator panel 30. The plurality of markings 32 typically found on the gear indicator panel 30 are located thereon for indicating the gear status of the vehicle 18. The markings 32 include the "P" corresponding to "park," the "R" corresponding to "reverse," the "N" corresponding to "neutral," and at least one marking to indicate "drive," shown herein by a "D1." The handle 28, as is typical of gearshift handles 28, shifts the gears of the vehicle 18.

The user is in the vehicle 18. As shown herein, the indicator arrow 36 shows that the handle 28 of the gearshift 12 is adjacent to R on the gear indicator panel 30 and thus the vehicle 18 is in reverse. The sensor 34 sensed the gearshift 12 moving from D1, in FIG. 2, for example, to R, shown herein. In response to the gearshift 12 moving to R, the sensor 34 causes the volume of the audio component 16 to one of cease or to lower by a predetermined level.

The gearshift sensor 34 also senses when the gearshift 12 returns to one of P-park, N-neutral, or D-drive. When the gearshift 12 has returned to one of P-park, N-neutral, or D-drive for more than a predetermined amount of time while the car is still on, the volume of the audio component 16 gradually returns to the level of volume before the gear status was that of R-reverse.

FIG. 4 is a block diagram of the gear shift of the volume reducing mechanism 10 of the present invention. The volume reducing mechanism 10 includes the gear shift sensor 34, a switch 38, a processor 22 and the audio component 16. The gear shift sensor 34 determines the position of the gears of the vehicle 18, shown in FIG. 2. Shown herein, the sensor 34 senses that the gear of the vehicle 18 is in the drive position. When the vehicle 18 is in the drive position, the switch 38 is in a first open position. The switch 38 of the volume reducing mechanism 10 also operates in a similar fashion when the gear sensor 34 senses that the gears of the vehicle 18 is one of P-park position and N-neutral position. When the switch 38 is in the first open position, a user is able to control the processor 22 to operate the audio component in any desired manner. As shown herein, the audio component is in a first "on" position and is able to audibilize a sound at a user-selected volume level to be output by at least one output device (not shown).

When the gear shift sensor 34 senses that the vehicle 18 is in engaged in the reverse position, the sensors causes the switch 38 to move from the first open position to a second closed position. When the switch 38 is in the second closed position, the processor 22 causes the audio component 16 to move from the first "on" position to a second "off" position. When the audio component 16 is caused to be in the second "off" position, the audio component 16 at least one of ceases to audibilize the selected sound at the user-selected volume and reduces the sound currently being audibilized by the audio component to a predetermined level which is lower than the user-selected volume level. Ceasing to audibilize the sound or at least lowering the volume to a predetermined lower level when the vehicle 18 is driving in reverse, makes vehicular 18 operation safer. This action allows the user 14 to focus their entire attention to the activity of driving the vehicle in reverse and allows the user to concentrate on any objects or persons in the vicinity of the vehicle 18. Increasing the user's 14 focus on these objects and details increases the likelihood that the driver will avoid these objects and decreases the amount of mishaps caused by inadequate level of attention being paid while driving a vehicle in reverse while backing up.

Additionally, when the sensor 34 senses that the gear of the vehicle is moving from the second reverse position to the first drive, park, or neutral position, the sensor causes the switch 38 to move back into the first open position from the second closed position. Additionally, the sensor 34 is able to detect that the vehicle gear is being re-engaged from the reverse position to any of the park, neutral or drive position. When the sensor 34 senses this re-engagement, the sensor 34 signals the processor 22 of this action. Thus, when the switch 38 returns to the open position, the processor 22 causes the audio component 16 to move back into the first "on" position. Upon returning to the first "on" position, the volume at which the sound is audibilized by the audio component 16 increases gradually over a predetermined amount of time from either a zero-level or a reduced level until the sound being audibilized thereby is at the user-selected volume. Preferably, the predetermined amount of time ranges between substantially 3 seconds and substantially 10 seconds, and more preferably is equal to substantially 5 seconds.

Figure 5:
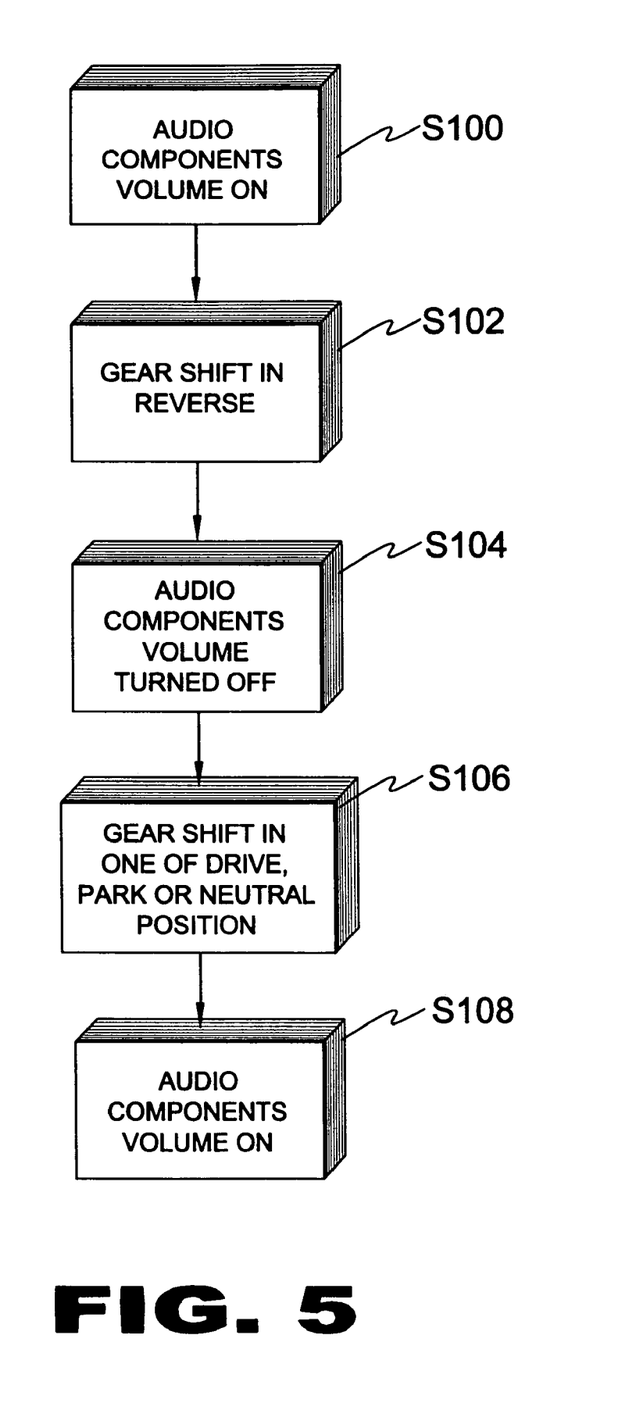
FIG. 5 is a flow diagram of the volume reducing mechanism of the present invention.

FIG. 5 is a flow diagram of the volume reducing mechanism 10 of the present invention. In step S100, the audio component is operating to audibilize sound from at least one output device at a user-selected volume. While in step S100, the vehicle may be engaged in one of park, neutral or drive. The gear shift is then moved into the reverse position in step S102. In step S104, the audio component volume is automatically turned off. Alternatively, step S104 can include reducing the volume of the audio component to a level less than the user-selected volume level. The result of steps S102 and S104 is reducing any ancillary distraction to the driver thereby allowing the driver to more safely maneuver the car in reverse and pay increased attention to objects in the vicinity of the vehicle.

Upon the driver determining that driving in reverse is no longer necessary, the driver causes the gear shift to moved into one of drive, park or neutral in step S1106. After the gear shift is moved back into one of drive, park or neutral in step S106, in step S108 the audio component is caused to audibilize sound at the user-selected volume as output in step S1100.

Figure 6:
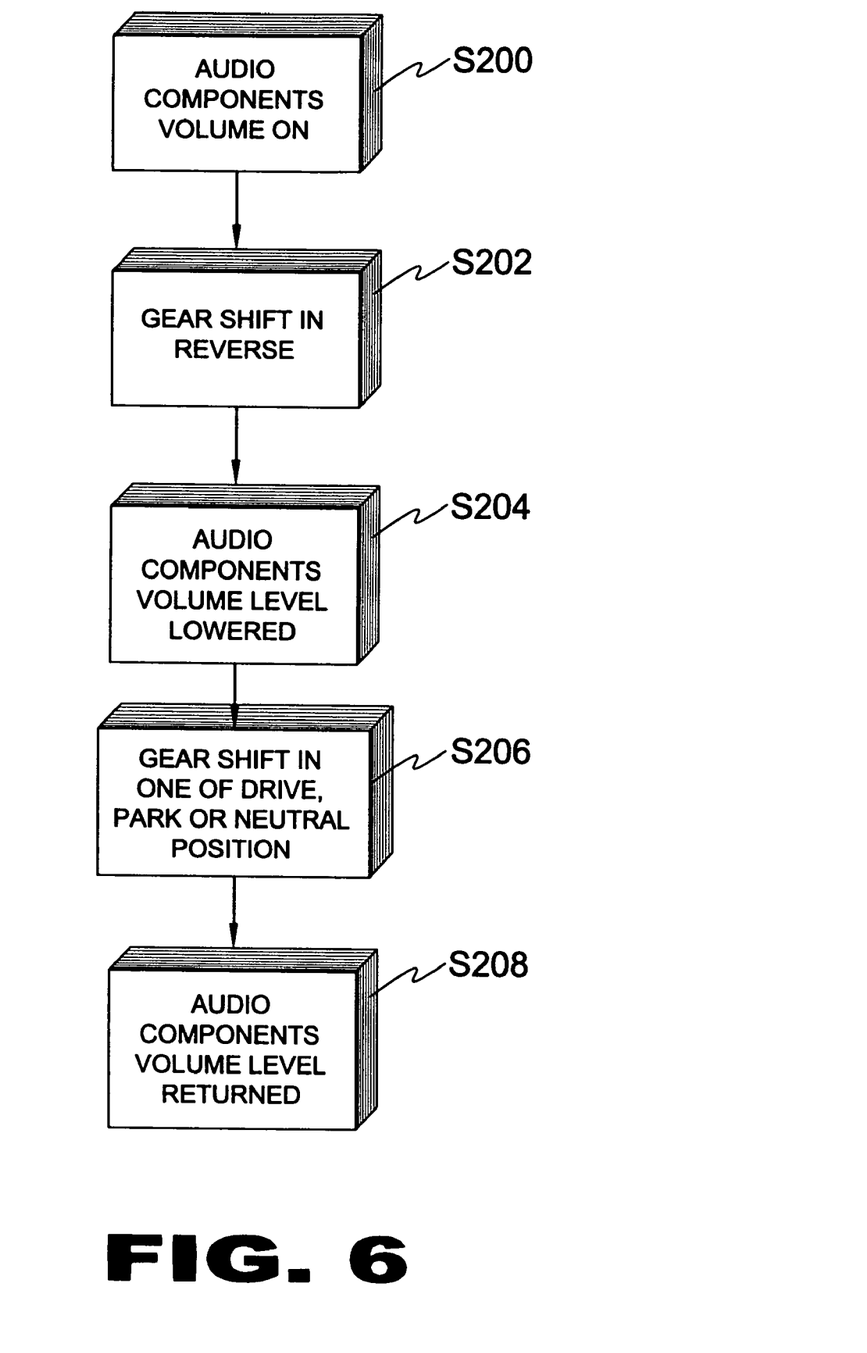
FIG. 6 is a flow diagram of an alternate embodiment of the volume reducing mechanism of the present invention.

FIG. 6 is a flow diagram of an alternate embodiment of the volume reducing mechanism 10 of the present invention. In step S200, the audio component is operating to audibilize sound from at least one output device at a user-selected volume. While in step S200, the vehicle may be engaged in one of park, neutral or drive. The gear shift is then moved into the reverse position in step S202. In step S204, the audio component volume is reduced to a predetermine level that is lower than the user-selected volume level. The result of steps S202 and S204 is reducing any ancillary distraction to the driver thereby allowing the driver to more safely maneuver the car in reverse and pay increased attention to objects in the vicinity of the vehicle.

Upon the driver determining that driving in reverse is no longer necessary, the driver causes the gear shift to moved into one of drive, park or neutral in step S206. After the gear shift is moved back into one of drive, park or neutral in step S206, in step S208 the audio component is caused to gradually increase the volume of the sound being audibilized until the sound is being audibilized at the user-selected volume as output in step S200. The gradual increase of the volume occurs over a predetermined amount of time, preferably equal to substantially 5 seconds.

Figure 7:
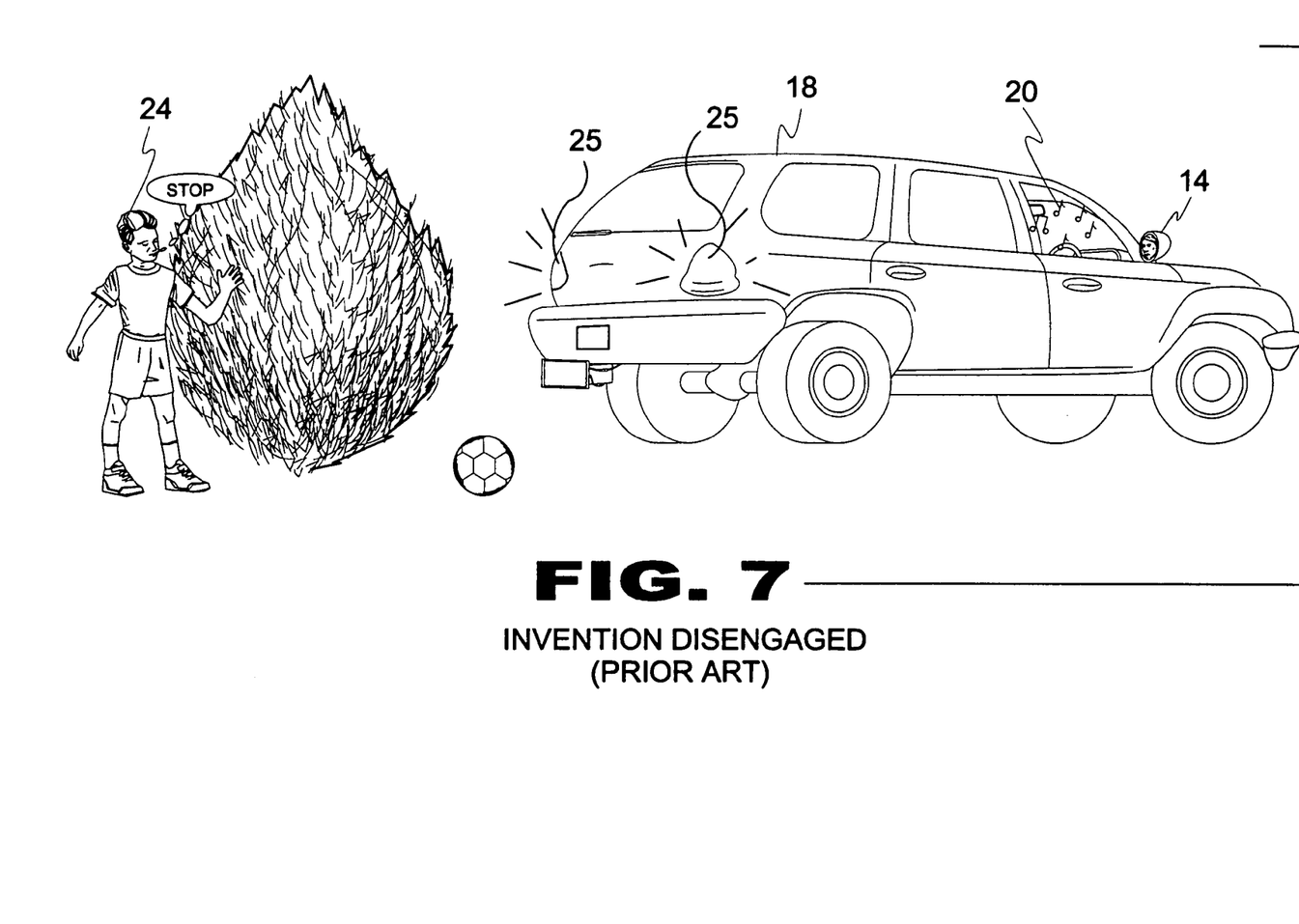
FIG. 7 is an illustrative view of the prior art that led to the volume reducing mechanism of the present invention.

FIG. 7 is an illustrative view of the prior art that led to the volume reducing mechanism 10 of the present invention. Shown herein, the user 14 is in the vehicle 18 and listening to music 20 from the audio component 16. A child 24 has lost control of a ball which has rolled behind the vehicle 18. The user 14 has used the handle 28 to change the gears and put the vehicle 18 in reverse as indicated by the illuminated reverse lights 25. However, because the music 20 is still playing and the driver is unable to react to the verbal request made by the child 24 telling the driver to stop so that the ball may be retrieved. In addition, the music 20 playing at a loud volume is also distracting to the user 14, preventing him 14 from being more cautious while reversing the vehicle 18. Thus, it is desirable to have the volume reducing mechanism of the present invention as described hereinabove with respect to FIGS. 1-6 and hereinafter with respect to FIGS. 8 and 9.

The volume reducing mechanism 10 of the present invention makes operation of a vehicle 18 safer. The audio component 16 can output music 20 at the user 14 desired level while the vehicle is in engaged in one of drive, park, or neutral. However, when the user 14 changes the gear of the vehicle 18 to reverse, the music 20 is one of lowered to a predetermined level of stopped completely. In this way, the user's 14 attention is focused on the activity of reversing the vehicle 18, as opposed to listening to the audio component 16. When the focus is on reversing, the user 14 would be able to hear the child 24 telling him 14 to stop the vehicle from continuing in a reverse direction.

Figure 8:
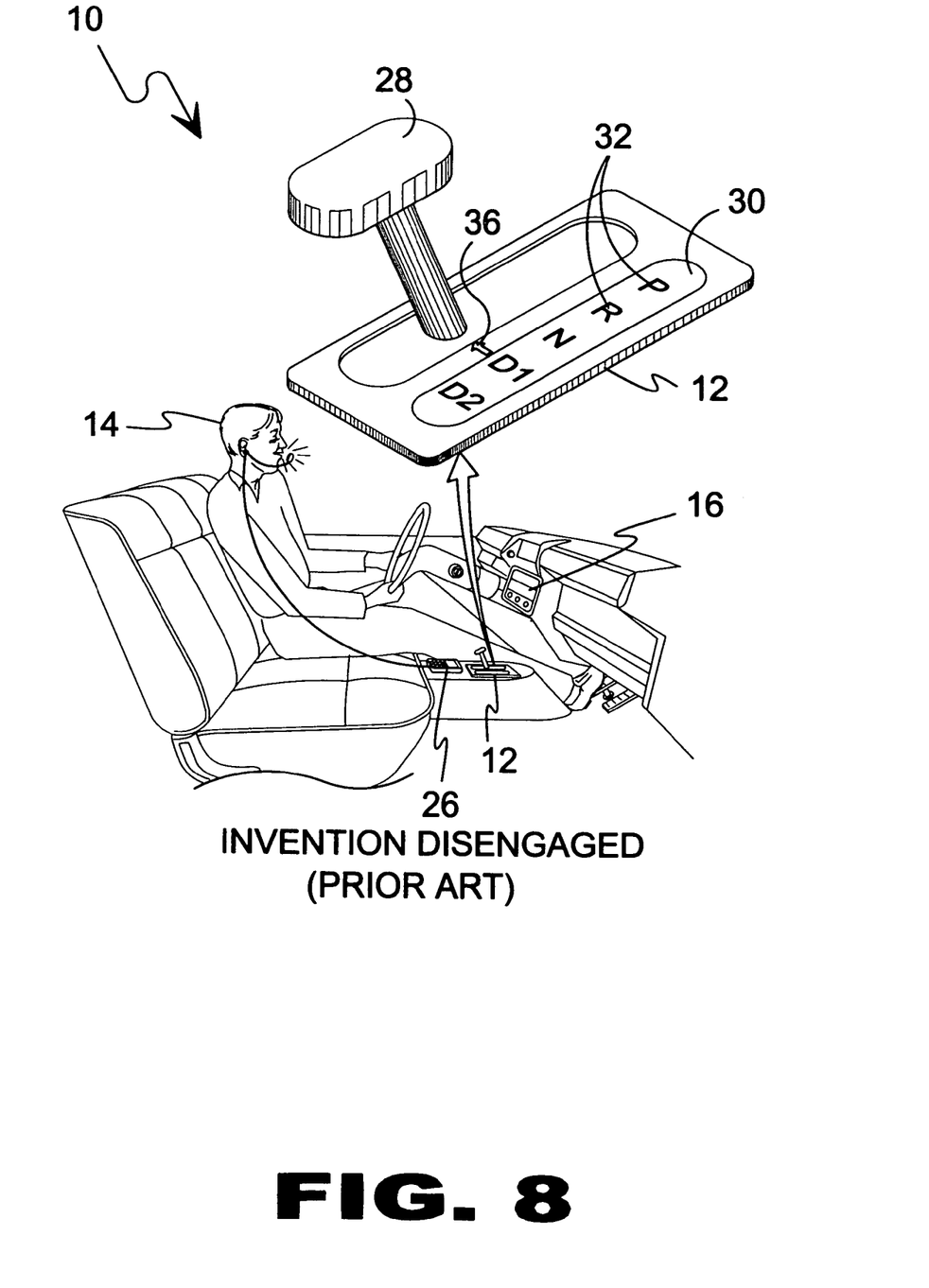
FIG. 8 is an illustrative view of the volume reducing mechanism of the present invention.

FIG. 8 is an illustrative view of an alternative embodiment of the volume reducing mechanism 10 of the present invention. The volume reducing mechanism 10 includes the gear shift sensor 34 for sensing the gear in which the vehicle 18 is currently engaged. However, this embodiment of the mechanism 10 of the present invention includes a connection between the sensor 34 and the operation of cellular telephone electronics. Cellular telephone use while driving has increased and it is desirable to have a mechanism to adjust or eliminate the volume being output by the cellular telephone speaker when the driver needs to maneuver the vehicle in reverse.

The user 14 is in the vehicle 18 and is operating the vehicle 18 in drive as indicated by the indicator arrow 36 which shows that the handle 28 of the gearshift 12 is adjacent to D1 on the gear indicator panel 30. When the sensor 34 senses that the gear of the vehicle 18 is one of P, N, or D, the sound of the cellular speaker is able to be output at the user-selected level. As shown herein, the sound is audibilized by a cellular head-set typically required as part of a hands-free kit. As shown herein, the cellular telephone is operating in a traditional manner and the user is able to selectively communicate using the phone.

Figure 9:
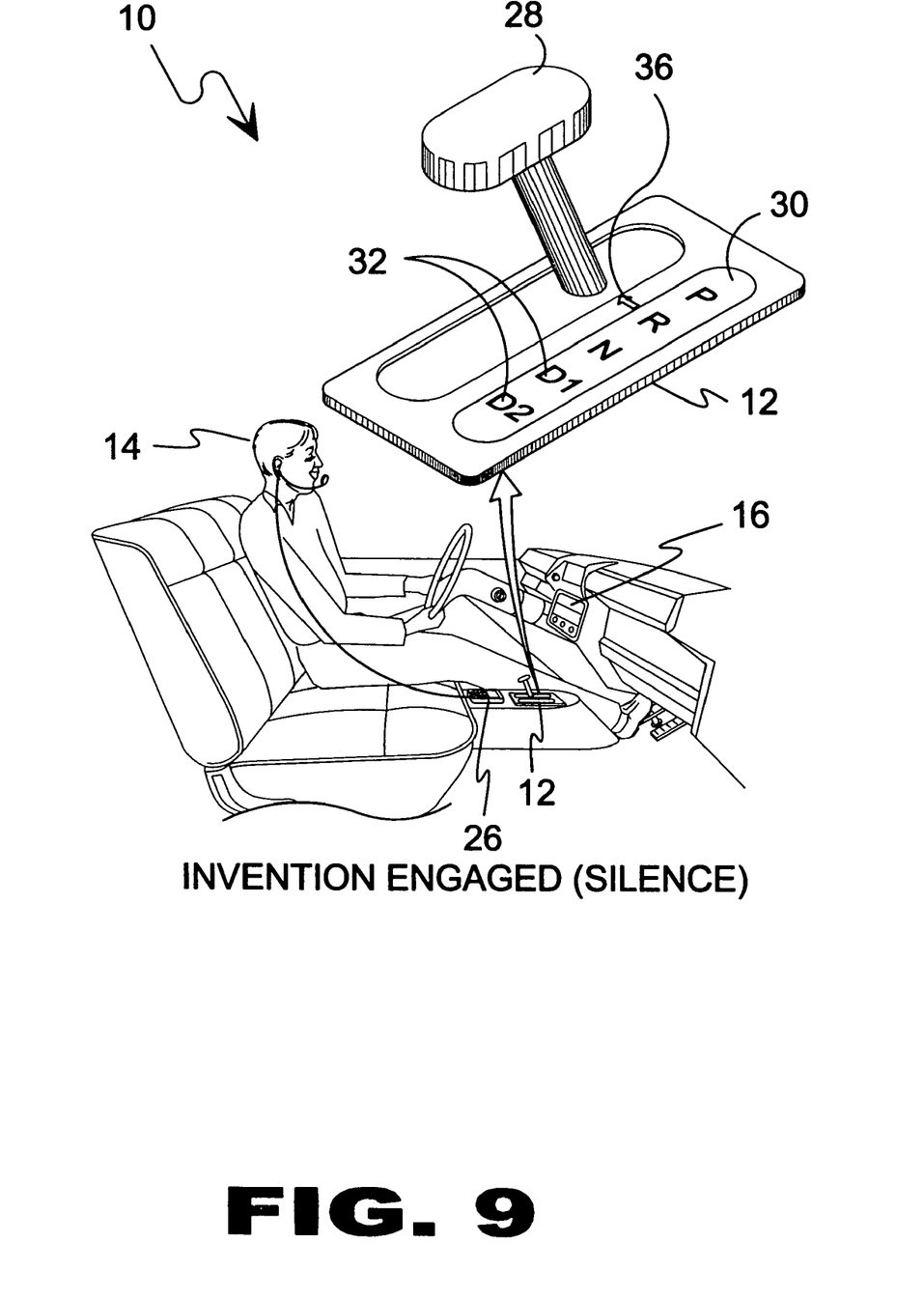
FIG. 9 is an illustrative view of the volume reducing mechanism of the present invention.

FIG. 9 is an illustrative view of the volume reducing mechanism 10 of the present invention. Shown herein is the volume reducing mechanism 10 connected to the cellular phone 26 engaged to selectively reduce the volume of the output speaker or to eliminate the sound from being output thereby.

The user is in the vehicle 18 and the indicator arrow 36 shows that the handle 28 of the gearshift 12 is adjacent to R on the gear indicator panel 30 and thus indicating that the vehicle 18 is in reverse. The sensor 34 sensed the gearshift 12 moving from D1, in FIG. 2, for example, to R, shown herein. In response to the gearshift 12 moving to R, the sensor 34 causes the volume of the cellular phone 26 to one of cease or to be lowered to a predetermined level. Shown herein, the volume has ceased. This grants the driver 14 greater focus while operating the vehicle 18 in reverse.

The gearshift sensor 34 also senses when the gearshift 12 returns to one of P-park, N-neutral, or D-drive. When the gearshift 12 has returned to one of P-park, N-neutral, or D-drive for more than a predetermined amount of time while the car is still on, the volume gradually returns to the level of volume before the vehicle 18 was put in R-reverse.

The device described hereinabove is intended to be formed integral with newly produced vehicles as well be formed as an add-on device to retro-fit previously produced vehicles. The device is able to work to reduce the volume of a plurality of audio components that are useable in a vehicle. These components include but are not limited to a radio, a CD player, a DVD player, a cassette player, a bi-directional communication device such as a cellular telephone, and an externally connectable electronic audio component such as a portable digital music player.

It will be understood that each of the elements described above, or two or more together may also find a useful application in other types of devices differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An apparatus for modifying sound audibilized from an audio component in a vehicle comprising:
    a) a processor connected to the audio component and for controlling the operation thereof;
    b) a sensor connected to a gear box of the vehicle for sensing a position of a gear in the vehicle and further connected to said processor, wherein said sensor senses said position of said gear and determines if said gear is in one of a first position or a second position and causes said processor to modify the audibilized sound based on said determination from a first sound level to a second sound level;
    c) wherein said first position includes said gear being engaged in at least one of a park gear, a neutral gear and a drive gear;
    d) wherein said second position includes said gear being engaged in a reverse gear; and
    e) wherein upon said determination that said gear is in said first position results in said processor causing said audio component to audibilize sound at said first sound level.

2. The apparatus as recited in claim 1, wherein upon said determination that said gear is in said second position said processor causes said audio component to audibilize sound at said second volume level.

3. The apparatus as recited in claim 1, wherein said first volume level is greater than said second volume level.

4. The apparatus as recited in claim 1, wherein said first volume level is a user-selected volume level.

5. The apparatus as recited in claim 1, wherein said second volume level is at least one of a zero-volume and a predetermined volume level that is less than said first volume level.

6. An apparatus for modifying sound audibilized from an audio component in a vehicle comprising:
    a) a processor connected to the audio component and for controlling the operation thereof;
    b) a sensor connected to a gear box of the vehicle for sensing a position of a gear in the vehicle and further connected to said processor, wherein said sensor senses said position of said gear and determines if said gear is in one of a first position or a second position and causes said processor to modify the audibilized sound based on said determination from a first sound level to a second sound level; and
    c) wherein upon said sensor sensing a change of gear position from said first position to said second position, said processor automatically modifies said audibilized sound to be output at said second volume level.

7. The apparatus as recited in claim 6, wherein said automatic modification comprises reducing the level at which said sound is audibilized to a predetermined level.

8. The apparatus as recited in claim 6, wherein upon said sensor sensing a change of gear position from said second position to said first position, said processor automatically modifies said audibilized sound to be output at said first volume level.

9. The apparatus as recited in claim 8, wherein said automatic modification comprises increase a level at which said sound is audibilized to said first volume level.

10. The apparatus as recited in claim 9, further comprising a timing mechanism in communication with said processor for providing a predetermined time frame for which said increase of said level at which said sound is audibilized is to occur.

11. The apparatus as recited in claim 10, wherein said predetermined time frame ranges between substantially 1 second and substantially 10 seconds.

12. The apparatus as recited in claim 10, wherein said predetermined time frame is substantially 5 seconds.

13. The apparatus as recited in claim 1, wherein said modification of said audibilized sound reduces ancillary distractions of a driver while operating the vehicle.

14. The apparatus as recited in claim 1, wherein the audio component for audibilizing sound comprises at least one of an radio, a CD player, a DVD player, a cassette player, a bi-directional communication device, and an externally connectable electronic audio component.

15. The apparatus as recited in claim 14, wherein said bi-directional communication device is a cellular telephone.

16. The apparatus as recited in claim 14, wherein said externally connectable electronic audio component is a portable digital music player.

* * * * *